United States Patent
Bryant et al.

(10) Patent No.: US 8,746,551 B2
(45) Date of Patent: Jun. 10, 2014

(54) PREDICTIVE FAULT RESOLUTION

(75) Inventors: Matthew K. Bryant, Gastonia, NC (US); Nicholas J. Munson, Charlotte, NC (US); Daniel J. Farinella, Charlotte, NC (US); William H. McGraw, Charlotte, NC (US); Nathan Dent, Concord, NC (US); Richard L. Fitzgerald, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 192 days.

(21) Appl. No.: 13/372,629

(22) Filed: Feb. 14, 2012

(65) Prior Publication Data

US 2013/0208295 A1    Aug. 15, 2013

(51) Int. Cl.
*G06Q 40/00* (2012.01)

(52) U.S. Cl.
USPC ................................... 235/379; 235/381

(58) Field of Classification Search
USPC ......................... 235/379, 380, 381
See application file for complete search history.

(56) References Cited

U.S. PATENT DOCUMENTS

| | | |
|---|---|---|
| 4,650,977 A | 3/1987 | Couch |
| 4,931,963 A | 6/1990 | Kimura et al. |
| 5,214,652 A | 5/1993 | Sutton |
| 5,386,104 A | 1/1995 | Sime |
| 5,550,816 A | 8/1996 | Hardwick et al. |
| 5,619,644 A | 4/1997 | Crockett et al. |
| 5,805,798 A | 9/1998 | Kearns et al. |
| 5,917,168 A | 6/1999 | Nakamura et al. |
| 5,964,831 A | 10/1999 | Kearns et al. |
| 5,984,178 A | 11/1999 | Gill et al. |
| 5,999,908 A | 12/1999 | Abelow |
| 6,263,497 B1 | 7/2001 | Maeda et al. |
| 6,405,329 B1 | 6/2002 | Colligan et al. |
| 6,437,692 B1 | 8/2002 | Petite et al. |
| 6,539,570 B2 | 4/2003 | Youn et al. |
| 6,574,686 B1 | 6/2003 | Sha et al. |
| 6,654,709 B2 | 11/2003 | Aoshika et al. |

(Continued)

FOREIGN PATENT DOCUMENTS

| | | |
|---|---|---|
| CN | 1852133 | 10/2006 |
| CN | 101221677 | 7/2008 |

(Continued)

OTHER PUBLICATIONS

Shankoo, "Self-Serviced Car Wash" (ADAM Forum—Powered by Discuz! Board), May 18, 2008, ADAM Forum.

(Continued)

*Primary Examiner* — Ahshik Kim
(74) *Attorney, Agent, or Firm* — Weiss & Arons LLP; Michael A. Springs, Esq.

(57) ABSTRACT

A method for predicting failure in an Automated Teller Machine (ATM) is provided. The method may include using a database to store information relating to the performance of a component function by an ATM component. The information may include normal performance information and fault information. The method may further include using a computational module to calculate a fault rate for the ATM component. The method may also include using a processor to compare the calculated fault rate to a threshold value associated with the component function. In the event that the fault rate exceeds the threshold value, the processor may initiate a request for service of the ATM component.

18 Claims, 6 Drawing Sheets

(56) References Cited

U.S. PATENT DOCUMENTS

| | | | |
|---|---|---|---|
| 6,687,714 B1 | 2/2004 | Kogen et al. |
| 6,711,612 B1 | 3/2004 | Blumenau et al. |
| 6,813,634 B1 | 11/2004 | Ahmed |
| 6,834,305 B1 | 12/2004 | Haynes et al. |
| 6,847,994 B1 | 1/2005 | Akimoto et al. |
| 6,880,003 B2 | 4/2005 | Greenwood |
| 6,896,179 B2 | 5/2005 | Satoh et al. |
| 6,917,594 B2 | 7/2005 | Feuerstraeter et al. |
| 6,953,150 B2 | 10/2005 | Shepley et al. |
| 6,976,622 B1 | 12/2005 | Trelawney et al. |
| 7,053,767 B2 | 5/2006 | Petite et al. |
| 7,151,780 B1 | 12/2006 | Belscher et al. |
| 7,163,144 B1 | 1/2007 | Trelawney et al. |
| 7,177,839 B1 | 2/2007 | Claxton et al. |
| 7,232,063 B2 | 6/2007 | Fandel et al. |
| 7,293,201 B2 | 11/2007 | Ansari |
| 7,295,993 B1 | 11/2007 | Meek et al. |
| 7,328,376 B2 | 2/2008 | McGuire et al. |
| 7,334,723 B2 | 2/2008 | Shepley et al. |
| 7,380,125 B2 | 5/2008 | Di Luoffo et al. |
| 7,401,264 B1 | 7/2008 | Gill et al. |
| 7,406,035 B2 | 7/2008 | Harvey et al. |
| 7,406,630 B1 | 7/2008 | Gill et al. |
| 7,484,134 B2 | 1/2009 | Wolf et al. |
| 7,522,916 B2 | 4/2009 | Grossi et al. |
| 7,599,859 B2 | 10/2009 | Fulton et al. |
| 7,600,671 B2 * | 10/2009 | Forrest et al. ............... 235/376 |
| 7,606,767 B1 | 10/2009 | Couper et al. |
| 7,620,948 B1 | 11/2009 | Rowe et al. |
| 7,641,107 B1 | 1/2010 | Gill et al. |
| 7,647,325 B2 | 1/2010 | Papatla et al. |
| 7,664,697 B2 | 2/2010 | Takayama |
| 7,677,447 B2 | 3/2010 | MacPhail et al. |
| 7,681,089 B2 | 3/2010 | Ashmore |
| 7,702,773 B2 | 4/2010 | Lopez |
| 7,717,327 B2 | 5/2010 | Gomes |
| 7,738,123 B2 | 6/2010 | Burgoyne et al. |
| 7,757,940 B2 | 7/2010 | Sawa |
| 7,774,649 B2 | 8/2010 | Neilan |
| 7,778,937 B2 | 8/2010 | Ferrara et al. |
| 7,792,045 B1 | 9/2010 | Vijendra |
| 7,796,528 B2 | 9/2010 | Yoshizawa |
| 7,860,016 B1 | 12/2010 | Vijendra et al. |
| 7,861,120 B2 | 12/2010 | Cui |
| 7,873,726 B2 | 1/2011 | Ofir et al. |
| 7,908,525 B2 | 3/2011 | Fujishita |
| 7,921,420 B2 | 4/2011 | Ferlitsch |
| 7,926,712 B2 | 4/2011 | Schlabach et al. |
| 7,934,006 B2 | 4/2011 | Kato et al. |
| 7,937,460 B2 | 5/2011 | Vaught |
| 8,015,455 B1 | 9/2011 | Vannatter et al. |
| 8,161,330 B1 | 4/2012 | Vannatter et al. |
| 8,214,290 B1 | 7/2012 | Vannatter et al. |
| 8,255,698 B2 | 8/2012 | Li et al. |
| 8,397,108 B1 | 3/2013 | Vannatter et al. |
| 2002/0029350 A1 | 3/2002 | Cooper et al. |
| 2002/0065775 A1 | 5/2002 | Monaghan |
| 2002/0091972 A1 | 7/2002 | Harris et al. |
| 2002/0095480 A1 | 7/2002 | Drummond et al. |
| 2002/0125998 A1 | 9/2002 | Petite et al. |
| 2003/0040959 A1 | 2/2003 | Fei et al. |
| 2003/0110248 A1 | 6/2003 | Ritchie |
| 2003/0163388 A1 | 8/2003 | Beane |
| 2004/0003266 A1 | 1/2004 | Moshir et al. |
| 2004/0044693 A1 | 3/2004 | Hadley et al. |
| 2004/0050927 A1 | 3/2004 | Nozaki et al. |
| 2004/0073843 A1 | 4/2004 | Dean et al. |
| 2004/0225927 A1 | 11/2004 | Warpenburg et al. |
| 2005/0066019 A1 | 3/2005 | Egan et al. |
| 2005/0096810 A1 | 5/2005 | Mahoney et al. |
| 2005/0151987 A1 | 7/2005 | Kawaura et al. |
| 2006/0048017 A1 | 3/2006 | Anerousis et al. |
| 2006/0181406 A1 | 8/2006 | Petite et al. |
| 2006/0242389 A1 | 10/2006 | Browning et al. |
| 2007/0214215 A1 | 9/2007 | McCaleb et al. |
| 2008/0040543 A1 | 2/2008 | Yamazaki et al. |
| 2008/0116254 A1 | 5/2008 | Sleeman |
| 2008/0121692 A1 | 5/2008 | MacPhail et al. |
| 2009/0037284 A1 | 2/2009 | Lewis et al. |
| 2009/0057395 A1 | 3/2009 | He et al. |
| 2009/0058535 A1 | 3/2009 | Wilson |
| 2009/0081989 A1 | 3/2009 | Wuhrer |
| 2009/0161580 A1 | 6/2009 | Forsyth |
| 2009/0199044 A1 | 8/2009 | Hurrell |
| 2009/0199050 A1 | 8/2009 | Neilan |
| 2009/0199053 A1 | 8/2009 | Neilan et al. |
| 2009/0204856 A1 | 8/2009 | Sinclair et al. |
| 2009/0204858 A1 | 8/2009 | Kawaba |
| 2010/0042744 A1 | 2/2010 | Rahman et al. |
| 2010/0082933 A1 | 4/2010 | Fleming et al. |
| 2010/0115583 A1 | 5/2010 | Delia et al. |
| 2010/0161343 A1 | 6/2010 | Kennedy et al. |
| 2010/0162030 A1 | 6/2010 | Schindel, Jr. et al. |
| 2010/0162050 A1 | 6/2010 | Cathro |

FOREIGN PATENT DOCUMENTS

| | | |
|---|---|---|
| EP | 961246 | 10/2008 |
| EP | 2088564 | 12/2009 |
| WO | WO 01/35190 | 5/2001 |
| WO | WO 2004/044800 | 5/2004 |

OTHER PUBLICATIONS

Shankoo, "Self-Serviced Car Wash" (Self-Serviced Car Wash—Machine Automation—Vertical Market Applications—ADAM), May 18, 2008, ADAM Forum.

"NCR's Gasper Exchange enhances ATM management", Network Alliance, Dec. 18, 2006, Louisville, Kentucky.

European search Report for Application GB1007102.5, Aug. 12, 2010.

"NCR APTRA Advance NDC," NCR Corporation, retrieved on Feb. 1, 2010, Darien, Connecticut.

"NCR Aptra Exchange," NCR Corporation, retrieved on Feb. 1, 2010, Darien, Connecticut.

"A solution for processing transactions from any endpoint and upgrading legacy systems to support new delivery channels," ACI Worldwide, Retrieved on Feb. 1, 2010, Elkhorn, Nebraska.

Lai, Richard, "ING Direct's iOS app adds 'bump' money transfer feature for well-heeled posses," Engadget, May 2, 2011.

Chinese Official Action in Chinese Application No. 201010214689, Oct. 18, 2013.

* cited by examiner

PREDICTIVE FAULT RESOLUTION

FIELD OF TECHNOLOGY

This invention relates to providing apparatus and methods for predicting failure. More specifically, this invention relates to providing apparatus and methods for predicting failure in Automatic Teller Machines ("ATMs").

BACKGROUND OF THE INVENTION

ATM monitoring systems are typically failure-based. Such monitoring systems dispatch a technician only when an ATM component experiences a hard-down failure—i.e. a failure that terminates operation of at least a portion of the ATM. Because the technician is dispatched only after a hard-down failure, there is a considerable amount of ATM downtime while the technician travels to, and attempts to fix, the failed component. This is not desirable at least because ATM downtime is a source of frustration and loss of confidence to ATM users.

Prior to a component's hard-down failure, the component may start to degrade. The component degradation may result in the component improperly performing a portion of executed tasks. For example, an ATM card reader may begin to degrade upon the lapse of a time period and/or after a large number of usages. This degradation may result, for example, in the card reader failing to capture card information for one out of every fifty card swipes.

Thus, it would be desirable to provide systems and methods that identify component degradation and initiate servicing of the degraded component prior to the component's hard-down failure. This is desirable at least because fixing the component prior to a failure will reduce at least a portion of total ATM downtime and increase customer satisfaction.

For some ATM components, normal performance may include a percentage of improperly performed tasks. For these components, component degradation may result in the component performing a percentage of component faults greater than a percentage of component faults expected during normal performance. For example, an ATM note acceptor may typically reject 3% of input notes. A degraded note acceptor may reject more than 3% of input notes.

Thus, it would be further desirable to provide systems and methods that utilize a rate of occurrence of component faults to identify and remedy a degraded component prior to a hard-down failure.

SUMMARY OF THE INVENTION

An apparatus according to the invention for predicting failure in an Automated Teller Machine (ATM) is provided. The apparatus may include a database configured to store information relating to the performance of a component function by an ATM component. The information may include normal performance information and fault information. The apparatus may also include a computational module configured to calculate a fault rate for the ATM component. The apparatus may also include a processor configured to determine if the fault rate exceeds a threshold value associated with the component. In the event that the fault rate exceeds the threshold value, the processor may initiate a request for service of the ATM component.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for predicting Automatic Teller Machine ("ATM") failure is provided. The apparatus and methods of the invention may include a component analyzer. The component analyzer may receive information relating to the performance of one or more component functions by one or more components. The information may include normal performance information and fault information. For the purposes of the application, normal performance information may relate to a component's successful performance of a component function. Additionally, for the purposes of the application, fault information may relate to a component's improper performance of one or more component functions and/or a component's failure to perform one or more component functions.

Figure 2:
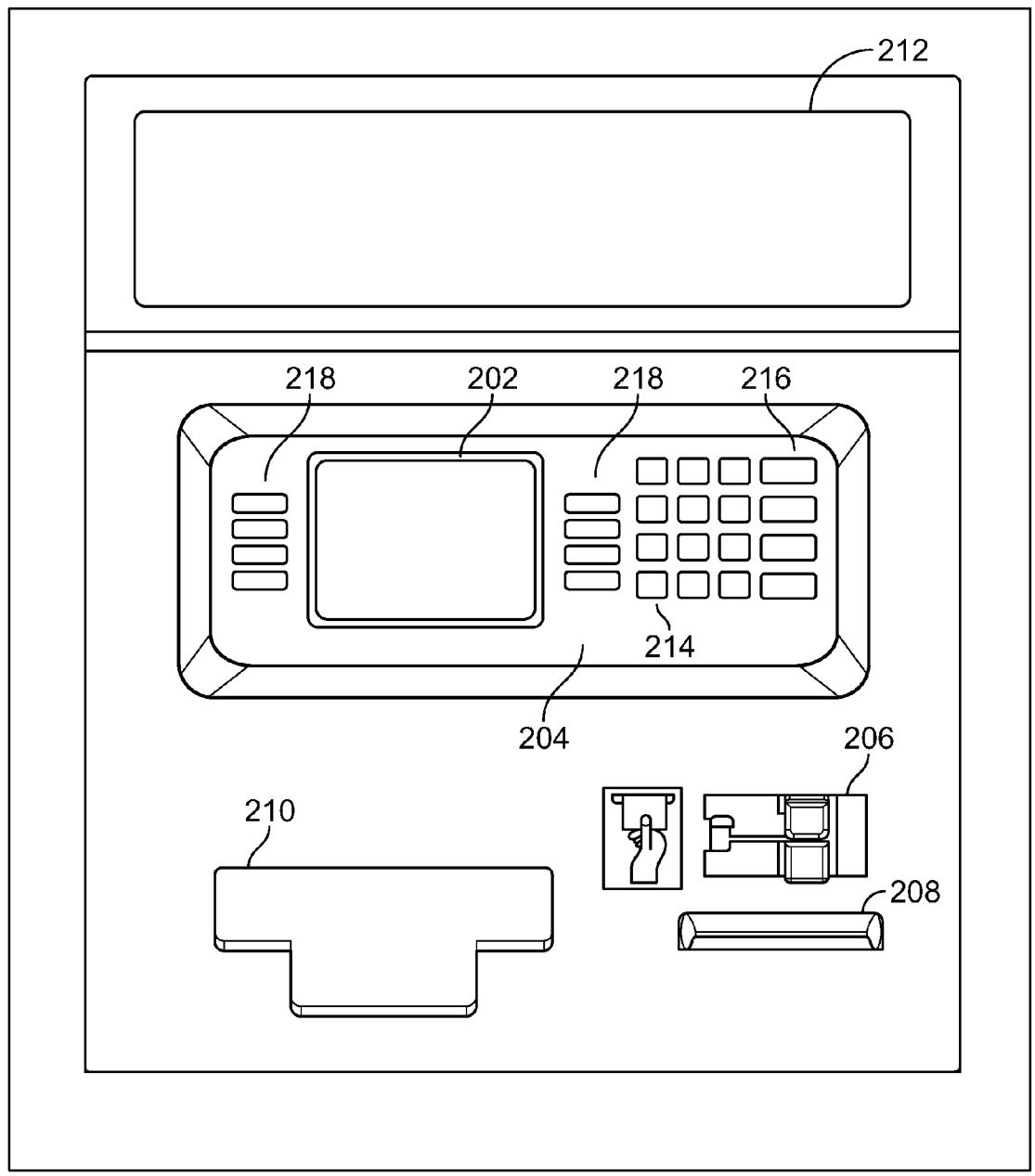
FIG. 2 shows additional apparatus that may be used in accordance with the principles of the invention.
Figure 3:
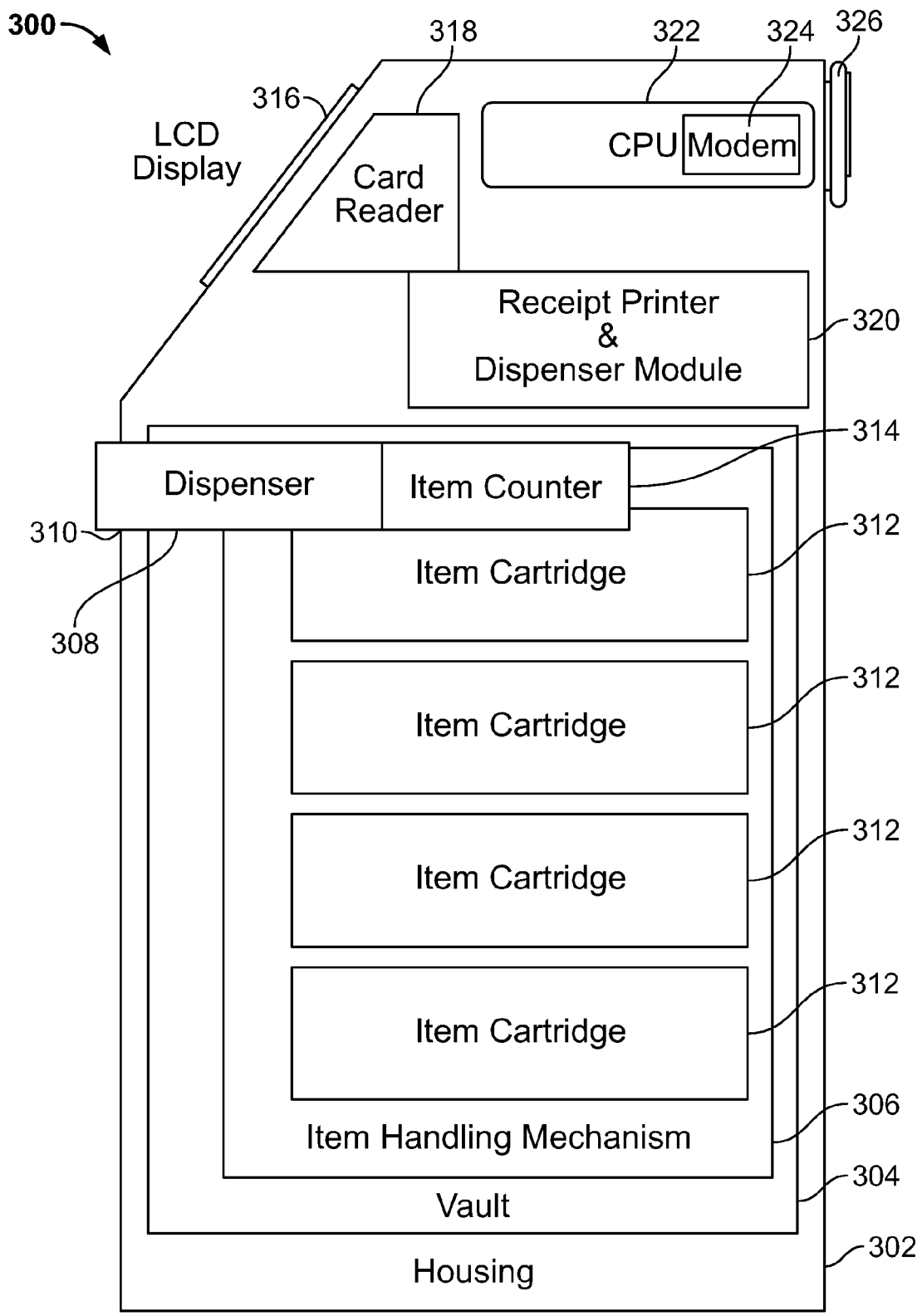
FIG. 3 shows a schematic diagram of another apparatus for use according to the principles of the invention.

Although the system discussed is directed to ATMs, this is for illustrative purposes only. The apparatus and methods of the invention may be used for any self-service device such as a cash recycler and/or a kiosk. The apparatus of the methods of the invention may also be used for any suitable hardware and/or software included in any machinery for which predicting failure is desirable such as a printer, computer and/or cell phone A component may include any device, object or peripheral. A component may also include a device object and/or a device structure. A device object may be understood to represent a logical, virtual, or physical device for which a driver handles I/O (input/output) requests. A device object structure may be understood to represent a software structure that can be used by an operating system to represent a device object. Exemplary components are illustrated in FIGS. 2-3 and described in the accompanying specification.

A component may generate fault information as a result of the component's degradation. It should be noted that the degraded component may or may not be located at an ATM. Exemplary causes of component degradation include faulty manufacturing, improper installation, high usage volume and/or the passage of time.

A component may also generate fault information as a result of the degradation of one or more components different from the component generating the fault information. For example, a check scanner may generate fault information relating to the rejection of check scan images generated by the check scanner. The rejection of the check scan images may be the result of the degradation of check scanner rollers that are failing to place the checks in the right place for the scan. Thus, the fault information generated by the check scanner is the result of the degradation of the check scanner rollers and not the degradation of the check scanner. Suitable algorithms can be written to determine whether to investigate the cause of the fault information.

Component degradation may cause a component to improperly perform of one or more component functions and/or fail to perform one or more component functions. The component degradation may occur prior to a component's hard-down failure. Thus, the component may generate fault data for a period of time prior to the component's hard-down failure. Additionally, the component may generate normal performance data during the period of time prior to the component's hard-down failure.

In the event that the component analyzer receives fault information that does not relate to a hard-down failure of the component, the component analyzer may process the fault information to determine if the ATM component is in a degraded state. In the event that the component analyzer determines that the ATM component is in a degraded state, the component analyzer may determine appropriate remedial action to be taken, if any, based on one or more thresholds.

Alternatively, component degradation may result in a hard-down failure of the component. In the event that the component analyzer receives fault information that relates to a hard-down failure, the component analyzer may substantially immediately notify a central server of the hard-down failure. The central server may initiate the electronic transmission of a job ticket to a technician to fix the failed component.

The component analyzer according to the invention may be embodied in hardware, software, or a combination of hardware and software. In the event that the component analyzer is embodied at least partially in hardware, the component analyzer may include one or more databases, receivers, transmitters, processors, computational modules and/or any other suitable hardware.

The component analyzer may be located at a single site or distributed between multiple sites. In some embodiments, the component analyzer may be located at an ATM. In these embodiments, the component analyzer may include software and/or hardware residing on the ATM. The component analyzer located at the ATM may be in communication with one or more remote terminals via one or more electronic communications systems.

The component analyzer located at the ATM may receive fault information and normal performance information from the components generating the data. The components may transmit the information directly to the component analyzer or the components may transmit the information to two or more receivers configured to subsequently transmit the information to the component analyzer. Alternatively, in the event that information is written to one or more log files within the ATM, the component analyzer may analyze the log file data during predetermined intervals or a receiver may receive log file data from the ATM during predetermined intervals.

In other embodiments, the component analyzer may be located at a central monitoring server. In these embodiments, the ATM may push fault information and normal performance information to the component analyzer during predetermined intervals. The ATM may determine when to push the information based on a volume of network traffic and/or a time of day to ensure available bandwidth for other ATM functions. Alternatively, in these embodiments, the component analyzer located at the central server may pull the information by transmitting a request for data to the ATM during predetermined intervals. The component analyzer may decide when to pull the information based on a volume of network traffic and/or a time of day to ensure available bandwidth for other ATM functions. It should be noted that a component analyzer located at a central server may receive the information from a plurality of ATMs. The data from the plurality of ATMs may include identifying information that identifies the location of the ATM and/or an ATM router that transmitted the data.

In yet other embodiments, the component analyzer may include hardware and/or software located at both the ATM and the central monitoring server. In these embodiments, the component analyzer may execute one or more of the functions included in the systems and methods of the invention at either the ATM or the central monitoring server.

It should be noted that the apparatus and methods of the invention may gather information, remotely execute processes and dispatch service instructions using any suitable communication protocol, such as Gasper Exchange ("Gasper"), a product of NCR Corporation, located in Duluth, Ga.

The component analyzer may receive fault information. In the event that the fault information does not relate to a hard-down failure of the component, the component analyzer may use one or more thresholds to determine if the component that produced the fault information has degraded. It should be noted that the component analyzer may access threshold data for each component and/or component function by querying a look up chart, database, or any other suitable electronic information repository.

The component analyzer may determine if a component has degraded by calculating a fault rate for the component. The component analyzer may calculate the fault rate for the component using the equation: [(number of times that the ATM component failed to perform a component function)/(number of times that the ATM component successfully performed the component function+number of times that the ATM component failed to perform the component function)]*100. It should be noted that any other suitable calculation for quantifying a failure rate of a component is included in the systems and methods of the invention.

Data included in the calculation may include data received by the component analyzer during a predetermined time period. Alternatively, data included in the calculation may include data generated by the component during a predetermined time period. In exemplary embodiments, the component analyzer may periodically—e.g. once a day—calculate the fault rate of a component. In these embodiments, the component analyzer may use data generated by the component within the last twenty four hours to calculate the component's fault rate. It should be noted that predetermined time periods included in the invention may be any suitable time period such as hourly, daily, bi-weekly, weekly and/or monthly.

It should additionally be noted that, in the event that a component performs two or more functions, the component analyzer may calculate a fault rate for each of the two or more component functions. In these embodiments, a fault rate computed for a first component function may include data relating to the performance of the first component function by the component and a fault rate computed for a second component function may include data relating to the performance of the second component function by the component.

Upon calculation of the fault rate, the component analyzer may compare the fault rate to a threshold value. If the fault rate is less than the threshold value, the component analyzer may determine that the component is not in a degraded state. If the fault rate is greater than the threshold value, the component analyzer may determine that the component is in a degraded state and initiate a request for maintenance. If the fault rate is equal to the threshold value, the component analyzer may or may not determine that the component is in a degraded state.

It should be noted that in some embodiments, the threshold value may be accessed by the component analyzer by querying a look-up table. The look-up table may be periodically updated upon receipt by the component analyzer of modified threshold values. It should additionally be noted that the threshold value used to determine if a component has degraded may be a threshold value associated with the component. In the event that the component performs two or more functions, each of the two or more functions may be associated with a different threshold value. Thus, the component analyzer may execute a separate determination for each of the component's functions to determine if the component has degraded.

For some ATM components, normal performance (i.e., non-degraded performance) may be determined to be consistent successful performance of a component function by a component. For these components, the threshold value will be a null ("0") value. Thus, in the event that these components generate fault information, the fault rate calculated for these components will be greater than zero and thus greater than the threshold value. This may result in the component analyzer determining that these components have degraded.

For other ATM components, normal performance may be determined to include a percentage of faults. For these components, component degradation may be manifest in component performance that includes a percentage of faults greater than a percentage of faults expected during normal component performance. For these components, the threshold value will be a value greater than zero.

For example, an ATM bill dispenser may typically fail to dispense 3% of requested bills during normal performance. Thus, for the bill dispenser, the generation of fault information alone does not signify component degradation. Rather, component degradation may be manifest in a bill dispenser fault rate that is computed to be greater than 3%. It follows that for the ATM bill dispenser, the threshold used by the component analyzer will be 3% or any other suitable value greater than 3%.

In some embodiments of the invention, each component and/or component function may be associated with one or more thresholds. Chart 1 includes exemplary thresholds associated with a component and exemplary remedial action that may initiated by the component analyzer in the event that a fault rate calculated for the component/component function meets and/or exceeds one or more of the thresholds:

TABLE 1

Illustrative Thresholds and Remedial Action.

| Number of Thresholds Associated with a Component/Component Function | Value of a Fault Rate (FR) Calculated for the Component/Component Function when Compared to a Threshold ($T_X$) Associated with the Component/Component Function | Remedial Action Initiated by the Component Analyzer |
|---|---|---|
| 1 ($T_1$) | (1) FR ≤ $T_1$ | (1) no action to be taken |
| | (2) FR > $T_1$ | (2) initiate a request for immediate maintenance |
| 2 ($T_1$, $T_2$) | (1) FR ≤ $T_1$ | (1) no action to be taken |
| | (2) $T_1$ < FR ≤ $T_2$ | (2) initiate a request for maintenance in the event that a technician has been assigned a maintenance job for a different ATM that is within a predetermined distance of the degrading ATM |
| | (3) FR > $T_2$ | (3) initiate a request for immediate maintenance |
| 3 ($T_1$, $T_2$, $T_3$) | (1) FR ≤ $T_1$ | (1) no action to be taken |
| | (2) $T_1$ < FR ≤ $T_2$ | (2) initiate a request for maintenance in the event that a technician has been assigned a maintenance job for a different ATM that is within a predetermined distance of the degrading ATM |
| | (3) $T_2$ < FR ≤ $T_3$ | (3) initiate a request for immediate maintenance |
| | (4) FR > $T_3$ | (4) initiate a request for immediate maintenance and terminate the functionality of the component |
| 4 ($T_1$, $T_2$, $T_3$, $T_4$) | (1) FR ≤ $T_1$ | (1) no action to be taken |
| | (2) $T_1$ < FR ≤ $T_2$ | (2) initiate a request for maintenance in the event that a technician has been assigned a maintenance job for a different ATM that is within a predetermined distance of the degrading ATM |
| | (3) $T_2$ < FR ≤ $T_3$ | (3) initiate a request for immediate maintenance |
| | (4) $T_3$ < FR ≤ $T_4$ | (4) initiate a request for immediate maintenance and terminate the functionality of the component |
| | (5) FR > $T_4$ | (5) initiate a request for immediate maintenance and terminate the |

TABLE 1-continued

Illustrative Thresholds and Remedial Action.

| Number of Thresholds Associated with a Component/ Component Function | Value of a Fault Rate (FR) Calculated for the Component/Component Function when Compared to a Threshold ($T_X$) Associated with the Component/Component Function | Remedial Action Initiated by the Component Analyzer |
|---|---|---|
| | | functionality of the ATM |

It should be noted that the system and methods of the invention include generating a job ticket for a technician that includes a hierarchy of ATM servicing jobs to be completed. The hierarchy may be based at least in part on a fault rate calculated for component(s) included in one or more of the ATMs. For example, a technician may be transmitted a job ticket for maintenance of ATMs located within a predetermined distance. The job ticket may include a hierarchical list of jobs to be completed by the technician. The hierarchical list may list the ATMs in ascending or descending order of importance. For example, the hierarchical list may display at the top the ATM determined by the component analyzer to be in the most degraded state and subsequently list in descending order ATMs determined by the component analyzer to be in successively less degraded states.

In the event that one or more of the ATMs displayed on the job ticket have been determined by the component analyzer to include a first degraded component, the job ticket may display a list of possible causes of the degradation of the first component degradation. The list may include two or more components different from the first component whose degradation may have resulted in the generation of fault information by the first component. For example, the list may state that a degraded check image scanner may have been determined to be in a degraded state because either the check image scanner itself has degraded and/or because check scanner rollers associated with the check image scanner have degraded.

It should additionally be noted that the component analyzer may compute a rate of increase of a component's calculated fault rate. The component analyzer may use this rate of increase to determine the proximity of a hard-down failure. For example, the component analyzer may execute a daily computation of a fault rate for a plurality of ATM components. The component analyzer may store the calculated fault rates in a database. The component analyzer may then execute a comparison of fault rates associated with each of the ATM components associated with the fault rates. In the event that the component analyzer determines that the fault rates of the ATM component are increasing at a rate of increase that exceeds a predetermined rate of increase, the component analyzer may initiate a request for service of the component even if the fault rate of the component has not yet exceeded a threshold that requests maintenance of the component.

The thresholds included in the systems and methods of the invention may be calculated by the component analyzer or by a processor or computational module separate from the component analyzer. The thresholds may be calculated by determining a normal usage pattern for a plurality of ATM components and/or functions associated with the plurality of ATM components. The normal usage pattern may then be associated with a threshold value. It should be noted that the threshold value may be a fraction, percentage, integer or any other suitable numerical representation.

In some embodiments, a separate threshold value calculation for ATM components and/or component functions may be executed for different groups of ATMs. For example, threshold values may be calculated for groups of ATMs with similar machinery, groups of ATMs located in similar geographic locations and/or climates, groups of ATMs with similar usage rates and/or groups of ATMs with similar amounts of dollar deposits. Threshold values may also be calculated for groups of ATMs in geographic locations associated with similar concentrations of customers and/or concentration of customers with similar net worth. In these embodiments, threshold value calculations for a group of ATMs may include data received from the group of ATMs for which the threshold value calculation is being made.

It should additionally be noted that the systems and methods of the invention may be used to determine if an ATM supplier has honored one or more of his contract terms. For example, when a company purchases an ATM from a vendor, the vendor may provide a specification for the ATM. The specification may state that the ATM purchased correctly performs certain functions a specified number of times before exhibiting degraded performance.

The systems and methods of the invention may be used to verify if the ATMs purchased from the vendors function according to the vendor's specification. The component analyzer may execute this determination by comparing component information included in a service life data report and/or an engineering specification to normal performance information and fault information received by the component analyzer.

For example, an engineering specification may state that a roller included in an ATM may "wear out"—i.e. begin to degrade—after 500,000 cycles. The roller may transmit normal performance information to the component analyzer each time the roller correctly executes a roller cycle. The component analyzer may store the transmitted information in a database and tally the number of correctly executed roller cycles executed by the roller. In the event that the component analyzer receives fault information from the roller prior to the correctly executed roller cycles tallying 500,000, the component analyzer may determine that the roller has failed to meet vendor specifications.

In the event that the component analyzer determines that one or more ATM components are not meeting the vendor's specification, the component analyzer may notify a remote server. The remote server may then initiate an electronic alert and/or rebate request to the company that purchased the ATM and/or to the vendor himself. Furthermore, the remote server may aggregate statistics to form a vendor index, outlining each vendor and the degree to which his ATM(s) conformed to vendor's specifications.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention described herein may take the form of an entirely hardware embodiment, an entirely software embodiment or an embodiment combining software, hardware and any other suitable approach or apparatus.

For example, the component analyzer may be embodied in whole or in part as a method, a data processing system, or a computer program product. Accordingly, the component analyzer may take the form of an entirely hardware embodiment, an entirely software embodiment or an embodiment combining software, hardware and any other suitable approach or apparatus.

Furthermore, aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, in the event that the component analyzer is embodied at least partially in hardware, the component analyzer may include one or more databases, receivers, transmitters, processors, modules including hardware and/or any other suitable hardware. Furthermore, the operations executed by the component analyzer may be performed by the one or more databases, receivers, transmitters, processors and/or modules including hardware.

Figure 1:
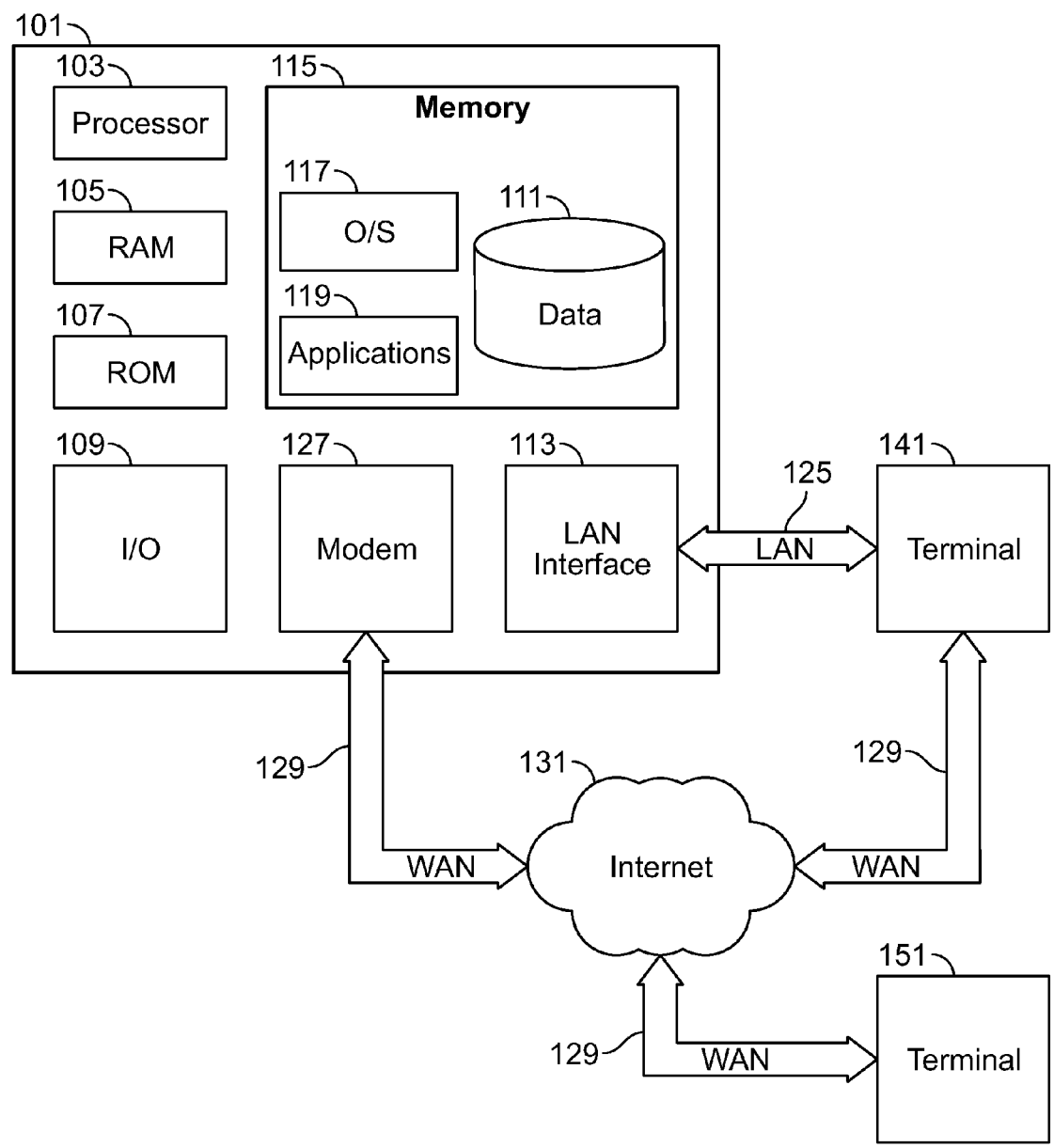
FIG. 1 shows apparatus that may be used in accordance with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115. It should be noted that the computer server 101 may perform one or more of the functions of the component analyzer according to the systems and methods of the invention.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 111, and any other suitable information, may be stored in memory 115.

One or more of applications 119 may include one or more algorithms that may be used to by processor 103 to calculate fault rates, threshold values, analyze data sets, parse electronic logs and/or execute any other suitable tasks related to ATM component analysis.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 2 shows illustrative ATM 200. ATM 200 may include monitor 202, keypad 204, card reader port 206, document acceptor 208, item dispenser 210 and security screen 212.

Monitor 202 may exchange visual and or audio information with a customer. Monitor 202 may include touch screen functionality. Keypad 204 may include alphanumeric keys 214 for the customer to enter numerical and textual data. Alphanumeric keys 214 may alternatively be referred to as a PIN pad. Keypad 204 may include control keys 216. In some embodiments, control keys 216 may be used to communicate control information, such as instructions, to ATM 200. Keypad 204 may include soft keys. Soft keys 218 may have functions that are dictated by programming and are presented to the customer using information that may be displayed on monitor 202.

Card reader port 206 may be the front end of any suitable card reader. The card reader may be a magnetic card reader—i.e. a card reader that magnetically reads encoded information on transaction instruments such as bank cards. The card reader may also be a smart card reader—i.e. a card reader that reads a chip instead of a magnetic strip. In some embodiments, ATM 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, ATM 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing. Document acceptor 280 may implement bill validation technology to validate the documents.

Item dispenser 210 may dispense items. For example, item dispenser 210 may dispense bills. Receipt printer 220 may print receipts. The receipts printed may include a history of transactions executed on the ATM, a visual representation of checks accepted by the ATM, and/or any other suitable information.

Security screen 212 may visually screen a surveillance device (not shown). The surveillance device may provide video information about individuals that are present near the ATM and the conditions there.

It should be noted that an ATM for use with the invention include hardware architecture that is similar to a personal computer. For example, an ATM for use with the invention may include one or more components included in computer server 101. Accordingly, the ATM may be able to use operating systems such as those available under the trademarks WINDOWS (from the MicroSoft Corporation, Redmond, Wash.) or LINUX (from sources such as Linux Online, Inc., Ogdensburg, N.Y.).

It should further be noted that the apparatus and methods may be scalable, for example, to cover all or a portion of the fleet of ATMs that run on a platform such as that available under the trademark APTRA platform, which is available from the NCR Corporation, Dayton, Ohio.

FIG. 3 shows illustrative ATM 300. ATM 300 may have one or more of the features of ATM 200 (shown in FIG. 2). ATM 300 may include housing 302. ATM 300 may include vault 304. Vault 304 may contain items (not shown). Item handling mechanism 306 may be present in vault 304. Item handling mechanism 306 may store, arrange, dispense and/or otherwise handle items for dispensing from ATM 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

ATM 300 may include LCD display 316 and a keypad (not shown) for customer interaction. Card reader 318 may be present for receiving transaction information from the customer via a suitable transaction instrument. ATM 300 may include receipt printer and dispenser module 320. Receipt printer and dispenser module 320 may provide the customer with a record of a transaction. CPU 322 may control customer I/O, user interface mechanisms, transaction devices, transaction channel communication, communication with a central server and dispensing processes, which may include initialization, actuation, dispensing, receipt printing and any other suitable processes. CPU 322 may also receive normal performance information, fault information and threshold values. In some embodiments, CPU 322 may compute a fault rate for one or more components, compare the fault rate to one or more thresholds, and/or determine whether or not any remedial action should be taken.

The transaction channel communications may be performed using modem 324, which may be any suitable communication device. Modem 324 may communicate with a local or regional network router (not shown). Service monitor 326 may be provided for a service technician to exchange information and instructions with CPU 322.

ATM 300 may additionally include a printer (not shown) for printing each transaction to a roll paper journal that is stored inside the ATM. The roll paper journal allows both the users of the ATMs and the financial institution associated with the ATM to settle disputes based on the records in the journal. In some cases, transactions are posted to an electronic journal. An electronic journal (referred to herein in the alternative, as an "electronic log") may remove the cost of supplying paper to the ATM and allow for electronic searching of data.

Figure 4:
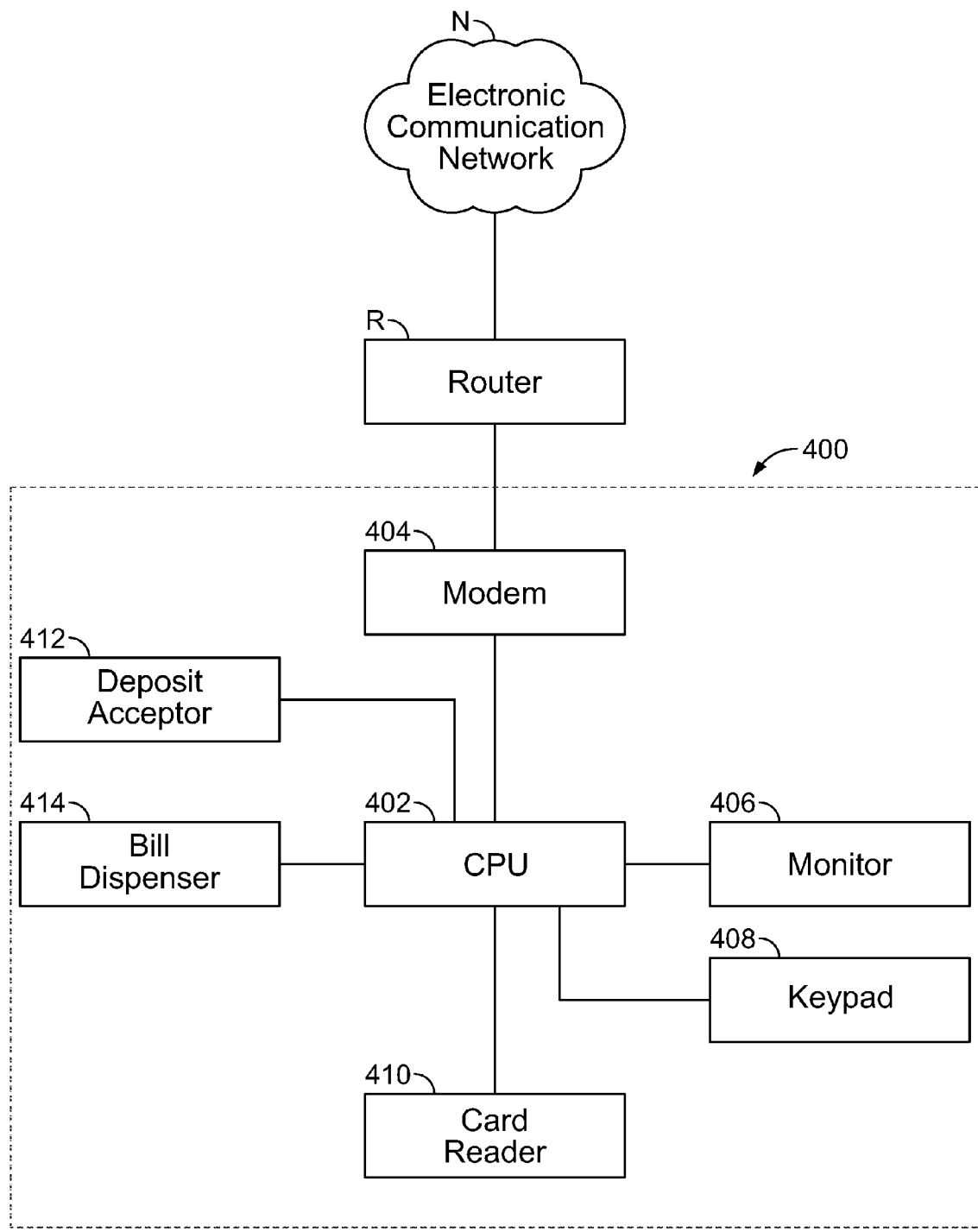
FIG. 4 shows a schematic diagram of hardware apparatus for use according to the principles of the invention.

FIG. 4 shows control system 400 for controlling an ATM such as 300 (shown in FIG. 3). System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414.

In the embodiments of the invention where the component analyzer is located at the ATM, CPU 402 may perform the functions of the component analyzer included in the invention. For example, CPU 402 may receive normal performance information and fault information from ATM components that may include one or more of modem 404, monitor 406, keypad 408, card reader 410, bill dispenser 414 and/or deposit acceptor 412. CPU 402 may subsequently calculate a fault rate for each of the components that transmitted normal performance information and fault information. CPU 402 may then compare a fault rate computed for a component to a threshold value associated to the component to determine what remedial action, if any, should be initiated.

In the embodiments of the invention where the component analyzer is located at a remote server, CPU 402 may receive normal performance information and fault information from ATM components that may include one or more of modem 404, monitor 406, keypad 408, card reader 410, bill dispenser 414 and/or deposit acceptor 412. CPU 402 may subsequently push the received information to the component analyzer through electronic communication network N via router R. Alternatively, the component analyzer may pull the data from CPU 402 by sending an electronic request for information to CPU 402 through electronic communication network N and router R.

Figure 5:
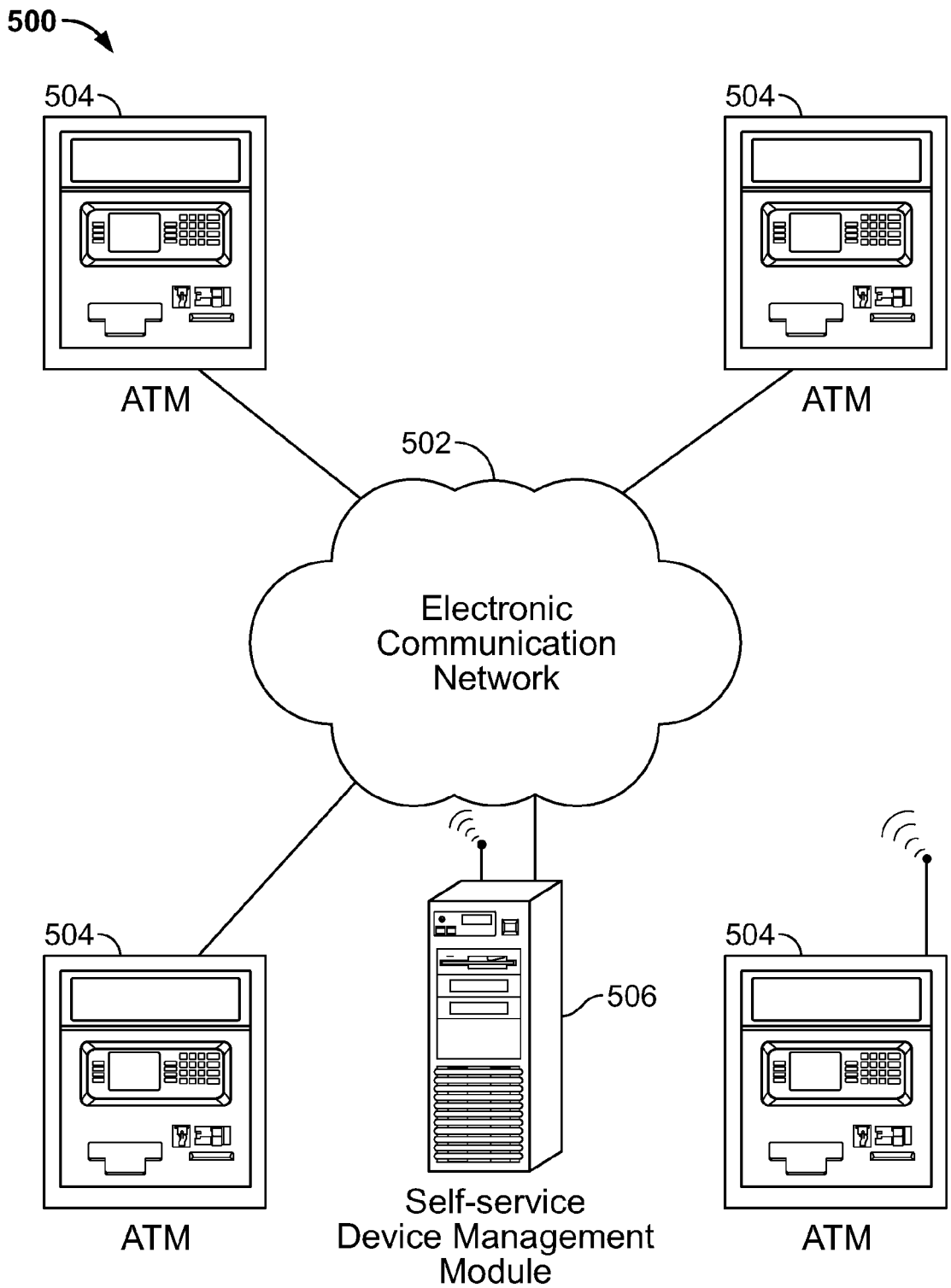
FIG. 5 shows a schematic diagram of a network for use according to the principles of the invention.

FIG. 5 shows illustrative transaction information network 500. Transaction information network 500 may include electronic communication network 502. Network 502 may be in part a LAN or WLAN, a WAN or WLAN or any other suitable network. Network 502 or portions thereof may be cabled, wired, optical fibered or wireless.

ATMs 504 may communicate via electronic communication network 502 with ATM management module 506. ATM management module 506 may include one or more devices shown in FIG. 1. A remote user may use ATM management module 506 to monitor, control, reset, repair and/or intervene in one or more processes of ATMs 504.

In some embodiments, ATM management module 506 may support at least some of the functions of the component analyzer according to the systems and methods of the invention. For example, ATM management module 506 may receive normal performance information and fault information from a plurality of ATMs, including ATMs 504. ATM management module 506 may use the received data to determine a suitable threshold value for different ATM components. ATM management module 506 may also use received data to determine if a component has degraded and remedial action needs to be taken according to the systems and methods of the invention.

Figure 6:
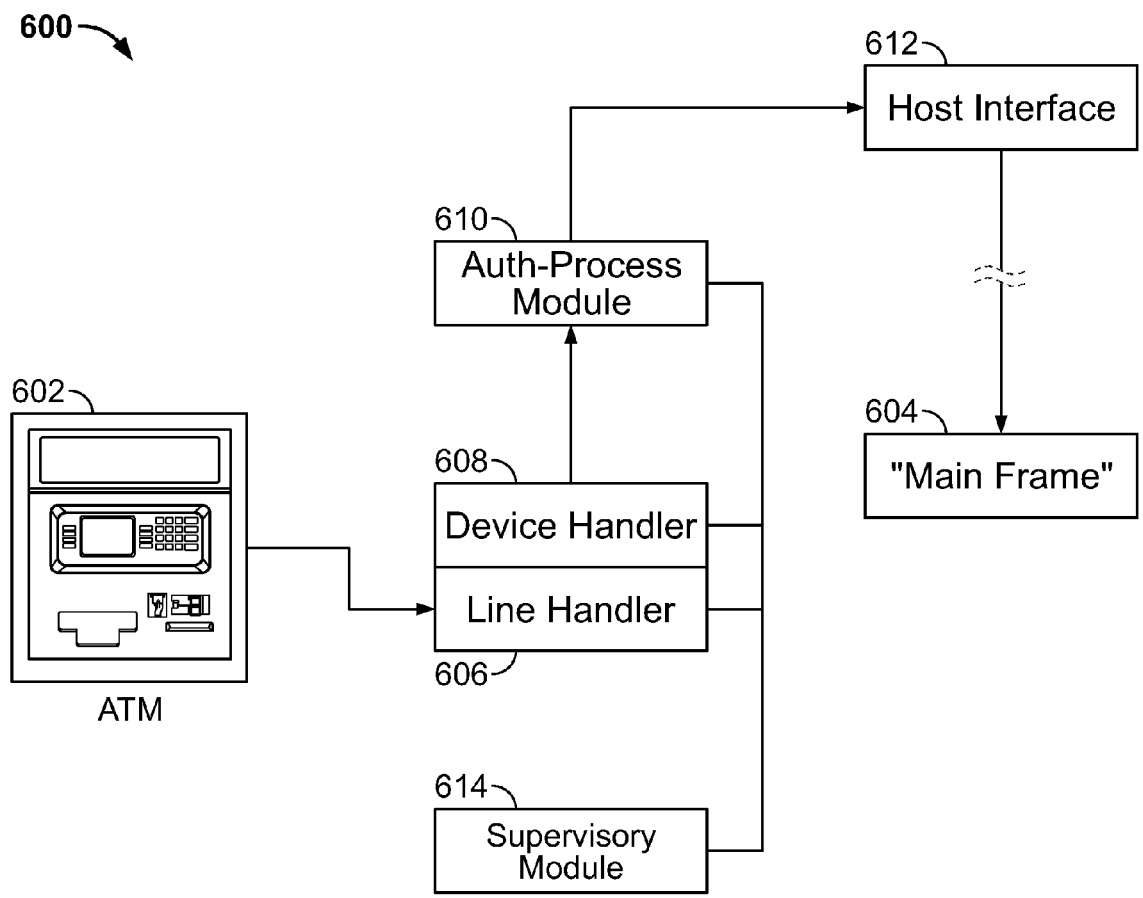
FIG. 6 shows a schematic diagram of another apparatus for use according to the principles of the invention.

FIG. 6 shows illustrative portions of communication system 600 for exchanging transaction information between ATM 602 and financial institution transactional platform 604. ATM 602 may be an ATM such as 300 (shown in FIG. 3). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions. Authorization requests may then be processed by auth-process module 610. Auth-process module 610 may then provide transactional information to host interface 612 for communication with platform 604.

Supervisory module 614 may receive diagnostic data from line handler 606, device handler 608, auth-process module 610, or any other suitable source. The diagnostic data may be used to manage ATM 602. The diagnostic data may be provided to a self-service management module such as 506 (shown in FIG. 5).

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for predicting failure in ATMs have been provided. Persons skilled in the art will appreciate that the present invention can be practiced by other than the described embodiments, which are presented for purposes of illustration rather than of limitation. The present invention is limited only by the claims that follow.

What is claimed is:

1. One or more computer-readable media storing computer-executable instructions which, when executed by a processor on a computer system, perform a method for predicting failure in an Automated Teller Machine (ATM), the method comprising:

using a database to store information relating to the performance of a component function by an ATM component during a predetermined time period, the information including normal performance information and fault information, wherein the normal performance information includes a number of times that the ATM component successfully performed the component function and the fault information includes a number of times that the ATM component failed to perform the component function;

using a computational module to calculate a fault rate for the ATM component, the fault rate being calculated at least in part by the equation [(number of times that the ATM component failed to perform the component function)/(number of times that the ATM component successfully performed the component function+number of times that the ATM component failed to perform the component function)]*100;

using a processor to compare the fault rate to a threshold value associated with the component; and in the event that the fault rate exceeds the threshold value, using the processor to initiate a request for service of the ATM component.

2. The computer-readable media of claim 1 wherein the method further comprises using a transmitter to transmit information to the database upon the lapse of a predetermined time period, the information including normal performance information and fault information generated by the component during the predetermined time period.

3. The computer-readable media of claim 1 wherein, in the method, the ATM component is a bill dispenser, the component function is the dispensing of bills, the normal performance information relates to the bill dispenser dispensing bills and the fault information relates to the bill dispenser failing to dispense bills.

4. The computer-readable media of claim 1 wherein the method further comprises using the computational module to calculate the threshold value.

5. The computer-readable media of claim 1 wherein, in the method, the threshold value is a first percentage and the fault rate is a second percentage.

6. The computer-readable media of claim 1 wherein, in the method, the ATM component is a first ATM component and the computational module is a first computational module, further comprising:

using a receiver to receive information from each of a plurality ATMs, the information including information relating to the performance of the component function by a component substantially similar to the first ATM component located at the each of the plurality of ATMs;

using a second computational module to compute the threshold value based at least in part on the information received from the plurality ATMs, wherein the second computational module is located at a remote server; and using a transmitter to transmit the threshold value to the first computational module, wherein the first computational module is located at the ATM.

7. The computer-readable media of claim 6 wherein, in the method, the plurality ATMs are located in a climate similar to the climate in which the first ATM is located.

8. The computer-readable media of claim 6 wherein, in the method, the plurality ATMs are associated with a volume of usage similar to a volume of usage associated with the first ATM.

9. The computer-readable media of claim 6 wherein, in the method, the plurality ATMs are located within a predetermined distance from the first ATM.

10. Apparatus for predicting failure in an Automated Teller Machine (ATM), the apparatus comprising:
 a database configured to store information relating to the performance of a component function by an ATM component during a predetermined time period, the information including normal performance information and fault information, wherein the normal performance information includes a number of times that the ATM component successfully performed the component function and the fault information includes a number of times that the ATM component failed to perform the component function;
 a computational module configured to calculate a fault rate for the ATM component, the fault rate being calculated at least in part by the equation [(number of times that the ATM component failed to perform the component function)/(number of times that the ATM component successfully performed the component function+number of times that the ATM component failed to perform the component function)]*100;
 a processor configured to determine if the fault rate exceeds a threshold value associated with the component function; and
 in the event that the fault rate exceeds the threshold value, the processor being further configured to initiate a request for service of the ATM component.

11. The apparatus of claim 10, wherein the processor is further configured to initiate the request for service in the event that a technician has been dispatched to a second ATM located within a predetermined distance from the first ATM.

12. The apparatus of claim 11, wherein the threshold value is a first threshold value and the ATM is a first ATM, wherein:
 the processor is further configured to compare the fault rate to second threshold value; and
 in the event that the fault rate exceeds the second threshold value, the processor being further configured to initiate substantially immediately a request for service of the ATM component.

13. The apparatus of claim 10 wherein the threshold value is a first percentage and the fault rate is a second percentage.

14. The apparatus of claim 10 wherein the ATM component is a printer, the component function is the printing of receipts, the normal performance information relates to the printer printing receipts and the fault information relates to failure of the printer to print receipts.

15. One or more computer-readable media storing computer-executable instructions which, when executed by a processor on a computer system, perform a method for predicting failure in a Self-Service Device (SSD), the method comprising:
 using a database to store information relating to the performance of a component function by a SSD component during a predetermined time period, the information including normal performance information and fault information, wherein the normal performance information includes a number of times that the SSD component successfully performed the component function and the fault information includes a number of times that the SSD component failed to perform the component function;
 using a computational module to calculate a fault rate for the SSD component, the fault rate being calculated at least in part by the equation [(number of times that the SSD component failed to perform the component function)/(number of times that the SSD component successfully performed the component function+number of times that the SSD component failed to perform the component function)]*100;
 using a processor to compare the fault rate to a threshold value associated with the component; and
 in the event that the fault rate exceeds the threshold value, using the processor to initiate a request for service of the SSD component.

16. The computer-readable media of claim 15 wherein the method further comprises using a transmitter to transmit information to the database upon the lapse of a predetermined time period, the information including normal performance information and fault information generated by the component during the predetermined time period.

17. The computer-readable media of claim 15 wherein the method further comprises using the computational module to calculate the threshold value.

18. The computer-readable media of claim 15 wherein, in the method, the threshold value is a first percentage and the fault rate is a second percentage.

* * * * *